United States Patent [19]

Hirakushi et al.

[11] Patent Number: 4,775,022
[45] Date of Patent: Oct. 4, 1988

[54] APPARATUS FOR CONTROLLING STEERING POWER IN POWER STEERING SYSTEM

[75] Inventors: Shuzo Hirakushi; Hideo Matsubara, both of Nara, Japan

[73] Assignee: Koyo Jidoki Kabushiki Kaisha, Nara, Japan

[21] Appl. No.: 27,027

[22] PCT Filed: Jun. 15, 1985

[86] PCT No.: PCT/JP85/00337

§ 371 Date: Feb. 9, 1987

§ 102(e) Date: Feb. 9, 1987

[87] PCT Pub. No.: WO86/07323

PCT Pub. Date: Dec. 18, 1986

[51] Int. Cl.$^4$ ............................................. B62D 5/06
[52] U.S. Cl. ..................................... 180/142; 91/434; 180/143
[58] Field of Search ................. 180/141, 142, 143; 91/371, 372, 373, 434

[56] References Cited

U.S. PATENT DOCUMENTS

| | | | |
|---|---|---|---|
| 3,994,361 | 11/1976 | Nishikawa et al. | 180/143 |
| 4,000,785 | 1/1977 | Nishikawa et al. | 180/143 |
| 4,293,051 | 10/1981 | Nishikawa | 180/143 X |
| 4,601,358 | 7/1986 | Kozuka et al. | 180/143 X |
| 4,632,204 | 12/1986 | Honaga et al. | 180/142 |
| 4,640,380 | 2/1987 | Daido et al. | 180/141 |

FOREIGN PATENT DOCUMENTS 60-33167 2/1985 Japan .
2174653 11/1986 United Kingdom ............... 180/143

Primary Examiner—John J. Love
Assistant Examiner—Charles R. Watts
Attorney, Agent, or Firm—Bruce L. Adams; Van C. Wilks

[57] ABSTRACT

A power steering system is hydraulically operated to decrease the manual steering force in response to the steering wheel angular displacement. A main pump supplies a first hydraulic fluid to the power steering system to operate the same. The main pump is hydraulically coupled to the power steering system so that the pressure of the first hydraulic fluid is affected by the operation of the power steering system and therefore is indicative of the steering wheel angular displacement. A reaction chamber receives a second hydraulic fluid from a subpump and is hydraulically operated to increase the steering force in proportion to the pressure of the second hydraulic fluid. A first control valve is disposed between the subpump and reaction chamber for increasing the second hydraulic fluid pressure applied to the reaction chamber in response to the vehicle speed, and a second control valve is disposed between the subpump and reaction chamber for increasing the second hydraulic fluid pressure applied to the reaction chamber in response to the first hydraulic fluid pressure indicative of the steering wheel angular displacement.

7 Claims, 2 Drawing Sheets

APPARATUS FOR CONTROLLING STEERING POWER IN POWER STEERING SYSTEM

TECHNICAL FIELD

The invention relates to an apparatus for controlling steering power in a power steering system which is used in an automobile.

PRIOR ART

It is generally preferred that the steering power of a power steering system which is used in an automobile is greatly reduced when the automobile is at rest or running at a very low speed while it assumes an increased value when running at higher speeds.

To this end, an arrangement as shown in FIG. 1 is employed in which a main pump 1 supplies hydraulic oil to a power steering system while a subpump 2 of a reduced size which is driven by a countershaft of a transmission, separately from the pump 1, supplies oil to an oil presssure reaction chamber 3, with a fixed throttle 5 disposed in a branch extending from the oil path to the reaction chamber 3 and leading to a tank 4 so that as the vehicle speed increases, the number of revolutions of the subpump 2 increases to increase a discharge flow therefrom, thus increasing the throttle pressure across the fixed throttle 5 to increase the pressure applied to the reaction chamber 3, which is effective to increase the steering force which is needed during the high speed running.

However, as a result of achieving an increase in the throttle pressure in response to the vehicle speed which represents a primary function, even though an excellent centering effect (the effect of providing a resistance to the steering wheel at the central position) is achieved, there results a disadvantage that as the steering wheel is operated, the corresponding pressure rise response (a rate of change in auxiliary power), which remains the same as it is fixed, causes a rapid reduction in the resistance experienced when operating the steering wheel, causing an unstable steering response.

As another consideration, it is preferred that the pressure produced by the subpump is raised to the order of several tens of kilograms per square centimeter in order to achieve the required steering response of the steering wheel under the high speed running condition, but the combination of a reduced discharge flow and an increased pressure results in an increased power loss of the subpump. The oil pressure reaction chamber may be provided with a seal which prevents an oil leakage from the reaction chamber. However, when subjected to a pressure on the order of several tens of kilograms per square centimeter during the time the vehicle is running at high speeds, the seal is continuously exposed to such pressure to be urged outward and expanded, thus producing a frictional resistance between the seal and its mating sealing surface. Such resistance disadvantageously causes a frictional feeling.

SUMMARY OF THE INVENTION

It is an object of the invention to provide a steering force controlled by a power steering system, which is needed to operate a steering wheel and which is greatly reduced when the vehicle is at rest or running at low speeds while being increased when the vehicle is running at higher speeds by means of a hydraulic oil from an oil pressure reaction chamber, to prevent a rapid reduction in the resistance experienced when operating the steering wheel under high speed conditions to thereby enhance a positive steering feeling while simultaneously eliminating a frictional feeling associated with the seal or the like.

DETAILED DESCRIPTION OF THE PREFERRED EMBODIMENTS

Figure 1:
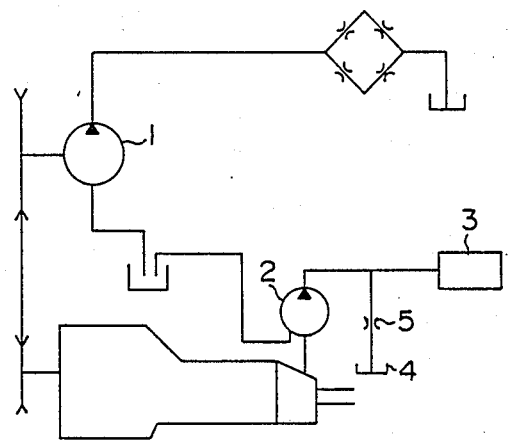
FIG. 1 is a schematic view of a conventional arrangement.
Figure 2:
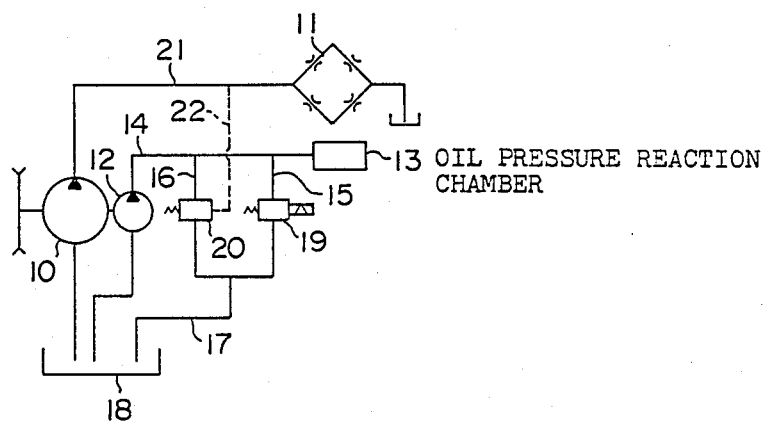
FIG. 2 is a schematic view of an arrangement according to the invention.
Figure 3:
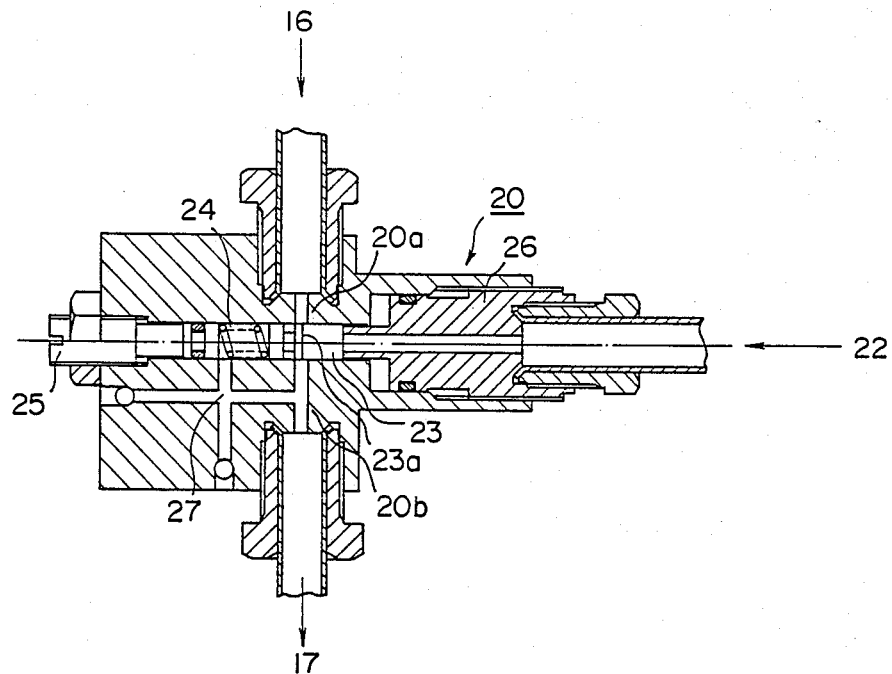
FIG. 3 is a longitudinal section of a pressure responsive valve according to one embodiment of the invention as illustrated in FIG. 2.

Referring to FIGS. 2 and 3, an embodiment of the invention will be described. Reference numeral 10 represents a main pump which supplies a hydraulic oil to a power steering system 11, and 12 represents a subpump of a reduced size which supplies a hydraulic oil to an oil pressure reduction chamber 13 and which is driven by a common drive shaft which is in turn driven by an engine. An oil path 14 to the oil pressure reaction chamber 13 branches into a pair of parallel oil paths 15, 16, which return through an oil path 17 to a tank 18. A vehicle speed responsive valve 19 is disposed in the oil path 15 and is mechanically coupled to a solenoid or stepping motor which is effective to change the degree of throttling action in accordance with the vehicle speed. A pressure responsive valve 20 is disposed in the oil path 16 to undergo a change in the throttling action in response to the oil pressure of in the main pump 10.

FIG. 3 shows one embodiment of a specific construction of the pressure responsive valve 20. An oil path 21 extends from the main pump 10 to the power steering system 11 and branches into an oil path 22 which leads to one end of a spool 23, the other end of which is resiliently supported by a spring 24. In an intermediate portion of its length, the spool 23 is formed with an opening 23a which extends therethrough in a direction perpendicular to the direction of sliding movement. The opening 23a has an upper end which communicates with an inlet opening 20a which in turn communicates with the oil path 16, and a lower end which communicates with a discharge port 20b which in turn communicates with the oil path 17. Thus, the inlet port 20a and the opening 23a form together a variable throttle. Reference numeral 25 represents a screw which is used to adjust the spring pressure of the spring 24, 26 represents a screw which positions the spool 23, and 27 represents an oil path which returns any leaking oil to the discharge port 20b.

The operation will now be described.

When the vehicle speed is very low:

At a number of revolutions of the subpump 12 which exceeds an idling condition, it discharges a fixed amount of oil. However, since an output from a vehicle speed sensor is zero or very small, the throttle of the vehicle speed responsive valve 19 is sufficiently open, whereby the throttle pressure which acts upon the reaction chamber 13 is not produced, as indicated in FIG. 4, allowing the steering wheel to be operated very lightly.

As the steering wheel is operated, the main pump 10 increases output pressure, whereby the spool 23 of the pressure responsive valve 20 is urged to slide to the left, as viewed in FIG. 3, thus closing the inlet port 20a. However, because the throttle of the vehicle speed responsive valve 19 is sufficiently open, there is only a small pressure rise which is as small as 0.1 kg/cm² or less and a rise in the reaction pressure of the oil pressure reaction chamber 13 is negligible.

Figure 4:
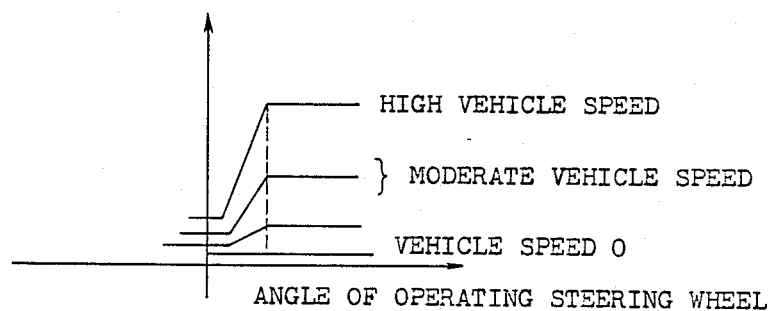
FIG. 4 graphically shows the relationship between a reaction pressure of the oil pressure reaction chamber and the angular displacement through which the steering wheel is operated.

Under moderate speed:

An output from the vehicle speed sensor actuates the vehicle speed responsive valve 19, and the throttle pressure which acts upon the oil pressure reaction chamber 13 increases as much as several atmospheric pressures, as illustrated in FIG. 4. Accordingly, the centering effect which occurs for a stright running condition is developed, tending to hold the steering wheel at its central position in a firm manner. When the steering wheel is operated under this condition, the pressure responsive valve 20 is actuated, and the pressure of the oil pressure reaction chamber 13 further increases a much as several atmospheric pressures, whereby the steering power force increases as the steering wheel is turned, without accompanying any rapid reduction in the resistance experienced in operating the steering wheel, thus affording a positive steering feeling.

When running at higher speeds:

An output from the vehicle speed sensor increases to a greater value, and the vehicle speed responsive valve 19 is further restricted, whereby the pressure of the oil pressure reaction chamber further increases, as illustrated in FIG. 4. This further enhances the centering effect to increase the stability under higher speeds. As the steering wheel is operated under this condition, the pressure responsive valve 20 is actuated to raise the pressure of the oil pressure reaction chamber 13 furthermore, without accompanying a rapid reduction in the resistance experienced in operating the steering wheel, thus affording an increased positive steering effect.

It will be understood that the subpump may be driven for rotation by a motor or a countershaft, and a vehicle speed responsive valve may comprise a fixed throttle.

In an arrangement including a main pump which supplies hydraulic oil to a power steering system and a subpump of a reduced size which supplies hydraulic oil to an oil pressure reaction chamber, a speed responsive valve disposed in an oil path which is branched from an oil path interconnecting the subpump and the oil pressure reaction chamber and which leads to a tank and operates to raise the pressure of the oil pressure reaction chamber in response to an increase in a vehicle speed so that the resistance experienced in operating the steering wheel under a high speed condition can be increased. A pressure responsive valve is connected in parallel relationship with the speed responsive valve to change the throttle according to the pressure of the main pump in accordance with the invention. This allows the steering force required to operate the steering wheel to be greatly reduced when the vehicle is at rest or when running at a low speed while providing a centering effect when the vehicle is running at higher speeds and simultaneously preventing a reduction in the resistance experienced when operating the steering wheel if the steering wheel is operated under the that the vehicle is running at higher speeds, thus improving a positive steering effect and also eliminating a frictional feeling. In addition, since the torque which is required when running at higher speeds can be established at the maximum pressure which is available for operating the steering wheel, an initial change in the pressure caused by the vehicle speed responsive valve can be minimized, thus minimizing the power loss associated with the subpump when the vehicle is running straightforward.

What is claimed is:

1. An apparatus for controlling a steering power in a power steering system which is used in an automobile, the apparatus comprising: a main pump which supplies a first hydraulic coil to the power steering system to operate the same; an oil pressure reaction chamber for controlling the steering power; a subpump of a reduced size smaller than that of the main pump for supplying a second hydraulic oil to the oil pressure reaction chamber to operate the same; a first oil path interconnecting the subpump and oil pressure reaction chamber to each other for flowing the second hydraulic oil through the first oil path; an oil tank; a second oil path branched from the first oil path and connected to the oil tank; a first control valve means disposed in the second oil path for raising the hydraulic pressure of the oil pressure reaction chamber in response to an increase in the running speed of the automobile so as to control the oil pressure reaction chamber to increase the steering power; and a second control valve means connected in parallel relationship with the first control valve means for changing the steering power in response to the hydraulic pressure of the first hydraulic oil supplied from the main pump.

2. An apparatus for hydraulically regulating the steering force needed to manually angularly displace a steering wheel of a vehicle in response to the angular displacement of the steering wheel and the vehicle speed, the apparatus comprising: a power steering system hydraulically operable to decrease the steering force in response to the steering wheel angular displacement; a main pump for supplying a first hydraulic fluid to the power steering system to operate the same, the main pump being hydraulically coupled to the power steering system so that the pressure of the first hydraulic fluid is affected by the operation of the power steering system and therefore is indicative of the steering wheel angular displacement; a reaction chamber receptive of a second hydraulic fluid and hydraulically operable to increase the steering force in proportion to the pressure of the second hydraulic fluid; a subpump for supplying the second hydraulic fluid to the reaction chamber to operate the same; first control means disposed between the subpump and reaction chamber for increasing the second hydraulic fluid pressure applied to the reaction chamber in response to the vehicle speed; and second control means disposed between the subpump and reaction chamber for increasing the second hydraulic fluid pressure applied to the reaction chamber in response to the first hydraulic fluid pressure indicative of the steering wheel angular displacement.

3. An apparatus according to claim 2; wherein the subpump has a size smaller than that of the main pump.

4. An apparatus according to claim 2; wherein the first control means includes a first throttle valve having a variable throttle for controlling the second hydraulic fluid pressure in response to the vehicle speed.

5. An apparatus according to claim 2; wherein the second control means includes a second throttle valve having a variable throttle for controlling the second hydraulic fluid pressure in response to the first hydraulic fluid pressure.

6. An apparatus according to claim 5; wherein the second throttle valve includes a spool movable in response to the first hydraulic fluid pressure to vary a throttle amount of the variable throttle.

7. An apparatus according to claim 2; including a first path for flowing the first hydraulic fluid from the subpump to the reaction chamber, a second path branched from the first path and connected to the first control means, and a third path branched from the first path and connected to the second control means.

* * * * *